United States Patent
Kalama et al.

(10) Patent No.: US 10,561,954 B1
(45) Date of Patent: Feb. 18, 2020

(54) METHODS FOR DYNAMIC SHOW-LENGTH VARIATION

(71) Applicant: Disney Enterprises, Inc., Burbank, CA (US)

(72) Inventors: Asa K. Kalama, Burbank, CA (US); Karl Nettmann, Burbank, CA (US); Robert E. Huebner, Burbank, CA (US); Jacqueline E. King, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/173,485

(22) Filed: Oct. 29, 2018

Related U.S. Application Data

(60) Provisional application No. 62/610,833, filed on Dec. 27, 2017.

(51) Int. Cl.
   *A63G 31/16* (2006.01)
   *H04N 21/8545* (2011.01)
   *H04N 21/44* (2011.01)

(52) U.S. Cl.
   CPC ............. *A63G 31/16* (2013.01); *H04N 21/44* (2013.01); *H04N 21/8545* (2013.01)

(58) Field of Classification Search
   CPC ........ A63G 31/16; A63G 31/02; H04N 21/44; H04N 21/8545; G05B 15/02; G06F 3/013; G06F 3/012; G09B 9/05
   USPC .............................................. 472/59; 104/69
   See application file for complete search history.

(56) References Cited

U.S. PATENT DOCUMENTS

| | | | |
|---|---|---|---|
| 6,796,908 B2 * | 9/2004 | Weston | A63G 7/00 434/55 |
| 9,900,645 B1 * | 2/2018 | Perng | H04N 21/41407 |
| 2015/0190726 A1 * | 7/2015 | Frolov | A63F 13/837 472/61 |

* cited by examiner

*Primary Examiner* — Michael D Dennis
(74) *Attorney, Agent, or Firm* — Kilpatrick Townsend & Stockton LLP

(57) ABSTRACT

Methods for dynamic show-length variation are disclosed herein. Such methods can include: a track extending from a starting position to a termination position; a first simulation vehicle that can move along the track from the starting position to the termination position; and a content presentation feature. Such methods can further include a processor. The processor can: determine a departure of the simulation vehicle from the starting position; provide content having a beginning, an end, and a plurality of scenes to the content presentation feature while the simulation vehicle is en route between the starting position and the termination position; and customize the length of the provided content so the content reaches the end as the simulation vehicle reaches the termination position.

10 Claims, 5 Drawing Sheets

METHODS FOR DYNAMIC SHOW-LENGTH VARIATION

CROSS-REFERENCES TO RELATED APPLICATIONS

This application claims the benefit of U.S. Provisional Application No. 62/610,833, filed on Dec. 27, 2017, and entitled "SYSTEMS AND METHODS FOR DYNAMIC SHOW-LENGTH VARIATION", the entirety of which is hereby incorporated by reference herein.

BACKGROUND OF THE INVENTION

The present disclosure relates generally to the customization of a simulated experience. A simulation is the imitation of a real-world process or event over time, or the imitation of an imaginary process or event over time. Simulations can include, for example, a simulation of the operation of a vehicle such as a car, an airplane, a boat, or a spaceship.

In an amusement park, a ride can be the hybrid of a simulation, a video game, and a traditional amusement ride. Such a ride can use received user inputs to affect the ride experience and which content is delivered to the passenger. Delivery of such content based on received passenger inputs can increase the satisfaction of people on the ride, and the ride becomes customized to their inputs. Thus, the ride becomes customized to the passenger and can provide a much more unique experience.

While such hybrid rides can have advantages as compared to more traditional rides, they can create problems and can be challenging to implement. Among these problems are the difficulty in creating an experience that is sufficiently variable to allow user inputs to significantly affect the experience, while also packaging this variable experience within the constraints of an amusement park ride. To improve overall passenger satisfaction, improvements to hybrid rides are desired to better package variability of content for delivery to the passenger.

BRIEF SUMMARY

Embodiments can provide systems and methods for dynamic show-length variation. This can particularly include the tracking of an estimated time of arrival of a simulation vehicle at a termination point of a ride and matching content delivered to that simulation vehicle, and specifically to a passenger on that simulation vehicle so that the delivered content reaches an end simultaneous with the arrival of the simulation vehicle at the termination point. This content that is delivered can vary based on user inputs that can be, in some embodiments, received in the simulation vehicle. These use inputs can change the presented content, and specifically can change the length of the presented content.

In some embodiments, either the length of the presented content can be affected by user inputs or user action, or the length of time before the simulation vehicle reaches the termination point can vary based on, for example, user actions. In some embodiments, for example, a user may quickly provide a input necessary for the progression of a story told by the presented content, or the user may slowly provide the input necessary for the progression of the story told by the presented content. Such inputs by users within a simulation vehicle can increase or decrease the length of time before the end of the provided content is received.

Further, if multiple simulation vehicles are moving towards the termination point by a common transit features such as a common track, user actions with regards to others of the simulation vehicles, such as the loading or unloading time of other users can affect the length of time before the simulation vehicle reaches the termination point. In some embodiments, the provided content can be adapted based on the progression through the content and the progression towards the termination point such that the content reaches its end simultaneous with the arrival of the simulation vehicle at the termination point.

One aspect of the present disclosure relates to a system for dynamic show-length variation. The system includes: a track extending from a starting position to a termination position, and a first simulation vehicle including passenger accommodations. In some embodiments, the first simulation vehicle can move along the track from the starting position to the termination position. The system can include a content presentation feature that can present content consumable by a passenger in the simulation vehicle; and a processor in communicating connection with the first simulation vehicle and the content presentation feature. In some embodiments, the processor can: determine a departure of the simulation vehicle from the starting position; provide content including a beginning, an end, and a plurality of scenes to the content presentation feature for presentation while the simulation vehicle is en route between the starting position and the termination position; and customize the length of the provided content so the content reaches the end as the simulation vehicle reaches the termination position.

In some embodiments, the starting position and the termination position are co-located. In some embodiments, the content present feature includes at least one of: a screen; a projector; a speaker; an animated prop; an animated figure; and a display. In some embodiments, the content can be a story. In some embodiments, customizing the length of the provided content includes at least one of: adding a scene; removing a scene; extending a scene; or extracting a scene. In some embodiments, the length of the provided content is customized based on a user input received from a passenger in the first simulation vehicle.

In some embodiments, the system can include a second simulation vehicle. In some embodiments, the length of the provided content can be customized based on a user input received from a passenger in the second simulation vehicle. In some embodiments, customizing the provided content includes: determining an estimated time until arrival at the termination position; determining a duration of the provided content until the end of the provided content; determining a discrepancy between the estimated time until arrival at the termination position and the duration of the provided content until the end of the provided content; and altering the provided content to minimize the determined discrepancy. In some embodiments, altering the provided content includes: identifying at least one flex scene; determining an update to the flex scene; and updating the flex scene. In some embodiments, the system includes a gaming engine generating a world from which content for providing is selected, wherein the flex scene is seamlessly updated without generation of a new world.

One aspect of the present disclosure relates to a method for dynamic show-length variation. The method includes: determining a departure of a first simulation vehicle from a starting position; providing content to a passenger of the simulation vehicle based on received user inputs in the first simulation vehicle, the content having a beginning, an end, and a plurality of scenes, which content is provided while the simulation vehicle is en route between the starting position and a termination position; and customizing the length of the provided content so the content reaches the end as the simulation vehicle reaches the termination position.

In some embodiments, the starting position and the termination position are co-located. In some embodiments, the content is provided via at least one of: a screen; a projector; a speaker; an animated prop; an animated figure; and a display. In some embodiments, the content can be an interactive story. In some embodiments, customizing the length of the provided content can include at least one of: adding a scene; removing a scene; extending a scene; or extracting a scene.

In some embodiments, the length of the provided content is customized based on a user input received from a passenger in a second simulation vehicle. In some embodiments, the method includes: determining arrival at the termination position; and providing an indicator to a passenger on the simulation vehicle to disembark the simulation vehicle.

In some embodiments, customizing the provided content comprises: determining an estimated time until arrival at the termination position; determining a duration of the provided content until the end of the provided content; determining a discrepancy between the estimated time until arrival at the termination position and the duration of the provided content until the end of the provided content; and altering the provided content to minimize the determined discrepancy. In some embodiments, altering the provided content includes: identifying at least one flex scene; determining an update to the flex scene; and updating the flex scene. In some embodiments, the method includes generating a virtual world with a gaming engine. In some embodiments, the provided content is provided from the generated virtual world. In some embodiments, the flex scene is seamlessly updated without generation of a new world. In some embodiments, the termination position can be a waypoint.

DETAILED DESCRIPTION OF THE INVENTION

Figure 1:
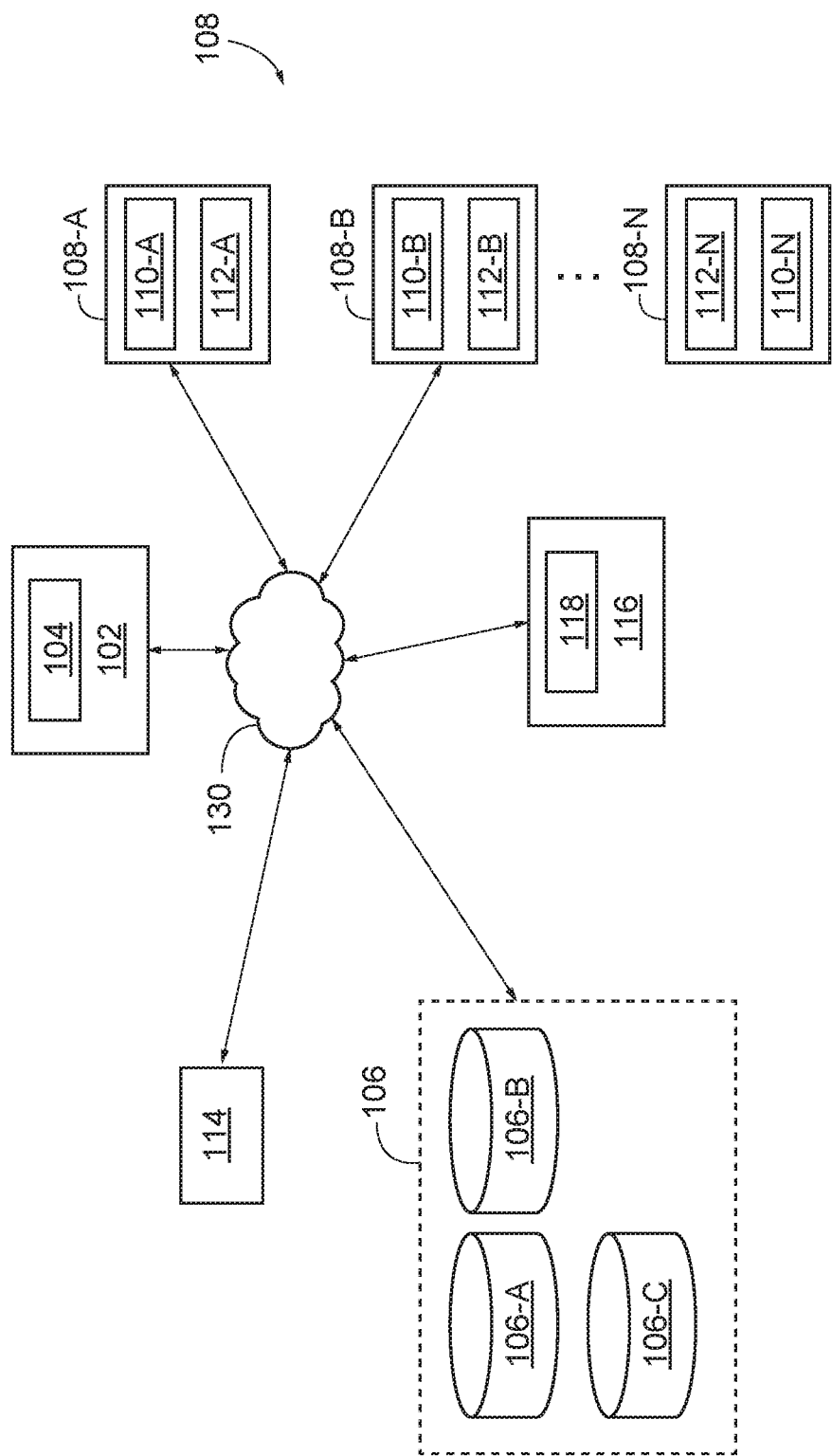
FIG. 1 is a schematic illustration of one embodiment of a simulation system for simulation of ambient light based on generated imagery.

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

I. Introduction

Developing technologies in simulation present many opportunities for future creation of amusement rides that provide a unique and customized experience for ride passengers. This customization and uniqueness can arise through the merging of tradition amusement rides with video gaming and simulation technologies to create hybrid rides that incorporate aspects of both traditional amusement rides and gaming/simulation. While such hybrid rides can create more interactive experiences than previously possible with traditional amusement rides, these hybrid rides present new problems.

The design of amusement rides involves the balancing of high passenger throughput against ride experience. This issue of throughput is further complicated inconsistencies in the amount of time taken to complete an amusement ride. These inconsistencies, in traditional rides, can arise from the loading and unloading of passengers, or from interruptions in the ride. These inconsistencies can result in the "bunching" of cars or sleds awaiting passenger loading or unloading, or at choke-points within the ride.

In addition to these sources of inconsistencies in traditional amusement rides, hybrid rides can also have inconsistency arise from different speeds of user inputs and different input choices by users. If a user input is a condition for advancement of the hybrid ride, different speeds with which the user provides this input can increase or decrease the amount of time for the simulation vehicle to reach a termination position. Further, if different user inputs result in the presentation of different content, then user inputs can either decrease or increase the duration of content until the end of the content is reached. Thus, in addition to the problems that can arise from inconsistencies in traditional rides, a hybrid ride can have even greater levels of inconsistency due to the greater role of the user in affecting the presented content and thus the duration of the presented content, as well as the greater role of the user A determined difference between the estimated time until arrival at the destination point and the estimated duration of content until the end of the content allow can be used to determine if and/or how to modify the content so that simulation vehicle arrives at the termination position simultaneous with the provided content reaching the end of the provided content, or the end of a story or narrative in the provided content. In some embodiments, the story or narrative can be an interactive story or narrative, such as can be traditionally provided in a video game.

The modification of the content can include the adding or removal of one or several scenes, or the modification to either increase or decrease the length of one or several scenes. In some embodiments, these one or several scenes that can be added, removed, or modified can non-contributory to the plot of the story of the presented content. In some embodiments, for example, such non-contributory scenes can include: the addition or removal of one or several opponents, events, or actions; the lengthening or shortening of a travel sequence such as, for example, the lengthening or shortening of the amount of time travel through a tunnel, through a cloud, across a bridge, and/or through space; and/or the modification of character development or small-talk type dialogue.

II. Simulation System

With reference now to FIG. 1, a schematic illustration of one embodiment of content management system 100 is shown. The content management system 100 can allow for and/or provide dynamic show-length variation. The system 100 can include a processor 102 which can include, for example, one or several processors or servers. The processor 102 can be any computing and/or processing device including, for example, one or several laptops, personal computers, tablets, smartphones, servers, mainframe computers, processors, or the like. The processor 102 can be configured to receive inputs from one or several other components of the system 100, to process the inputs according to one or several stored instructions, and to provide outputs to control the operation of one or several of the other components of the system 100.

In some embodiments, the processor 102 can include a game engine 104 that can include a rendering engine. The game engine 104 and the rendering engine can, together, or independently develop and/or progress or story of the amusement ride and/or the generate images, sound, and/or effects corresponding to that narrative. In some embodiments, this narrative or story can progress from a starting point to an end point, at which end point the story terminates. In some embodiments, this narrative or story can follow a storyline including starting a mission, including one or several objectives or tasks, travel to complete the mission, interacting with friendly or enemy characters, completing the one or several objectives or tasks, and returning from the mission.

The system 100 can include memory 106. The memory 106 can represent one or more storage media and/or memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data. The memory 106 can be an integral part of the processor 102 and/or can be separate from the processor 102. In embodiments in which the memory 106 is separate from the processor 102, the memory 106 and the processor 102 can be communicatingly linked via, for example, communications network 130. In some embodiments, the communications network 130 can comprise any wired or wireless communication connection between the components of the simulation system 100.

The memory 106 can include software code and/or instructions for directing the operation of the processor 102 and/or one or several databases 106 containing information used by the processor 102 and/or generated by the processor 102. These databases include, for example, a timing database 106-A, a scene database 106-B, and a customization database 106-C.

The timing database 106-A can include information identifying and/or tracking the progress of one or several simulation vehicles towards the termination point and/or identifying and/or tracking the duration of remaining content to be provided before the end of the content is reached. In some embodiments, the timing database 106-A can comprise a plurality of sub-databases each of which sub-databases in the plurality of sub-databases can be associated with one of the simulation vehicles and can contain a first portion containing information identifying and/or tracking the progress of the associated one of the simulation vehicles towards the termination point and a second portion identifying and/or tracking the duration of remaining content to be provided to the associated one of the simulation vehicles before the end of the content is reached. In some embodiments, the first portion can comprise a clock or a timer, and specifically can comprise a countdown timer counting down time until the associated one of the simulation vehicles reaches the termination point.

The scene database 106-B can comprise information relating to a plurality of scenes, sequences, objects, characters, events, or the like that each form a part of the provided content. In some embodiments, the scene database 106-B can comprise information from which the game engine 104 can generate a virtual world that is the source of the provided content. In some embodiments, the scene database 106-B can be organized into a plurality of sub-databases such as, for example: a character database; an object database; an event database; and/or a sequence database. In some embodiments, the character database can include information relating to one or several characters; the object database can include information relating to one or several objects such as weapons, vehicles, or buildings; and the event database can include information relating to one or several events that can occur in the virtual world such as, for example: the firing or use of a weapon; the controlling, driving, flying, and/or piloting of a vehicle; and/or the interactions between objects and/or characters.

The customization database 106-C can include information relating to one or several content customizations. These content customizations can include, for example, one or several changes to one or several portions of the provided content to increase the duration of the provided content or to decrease the duration of the provided content. These customizations can include, for example, the insertion of a scene, the deletion of a scene, the expansion of a scene, and/or the contraction of a scene. In some embodiments, the customization database 106-C can include one or several scene or changes to scenes that can be seamlessly included or used to seamlessly update the provided content to change the duration of the provided content.

The system 100 can include one or several simulation vehicles 108. In some embodiments, these one or several simulation vehicles 108 can move from a starting position in which one or several passengers can be loaded into the simulation vehicles 108 to a termination position where the one or several passengers can be unloaded from the simulation vehicles 108. As seen in FIG. 1, there can be a first simulation vehicle 108-A, a second simulation vehicle 108-B, and up to an $N^{th}$ simulation vehicle 108-N.

As depicted in FIG. 1, some or all of the simulation vehicles 108 can include accommodations such as one or several seats, one or several controls 110, and/or one or several effect features 112. In some embodiments, the controls 110 and the effect features 112 can provide information to the passengers such as, for example, via one or several displays, screens, monitors, speakers, or the like, and can include features with which the user can provide input to the simulation vehicle 108. In some embodiments, these one or several controls 110 can include, for example, one or several: buttons, levers, control sticks, pedals, knobs, dials, switches, slides, keypads, keyboards, steering wheels, or the like. The one or several effect features 112 can include, for example, one or several: gauges, displays, screens, microphones, speakers, motion bases, or the like. In some embodiments, the motion base can move the simulation vehicle 108 and can include one or several: motors; servo motors; pneumatic components; hydraulic components; or the like.

The simulation vehicle 108 can include a single set of user controls 112 for use by a single user in interacting with the simulation, or the simulation vehicle 108 can include multiple sets of user controls 112. The simulation vehicle 108 can move and/or be configured to move according to control signals received from the processor 102 and/or from the controls 110. Further, the content provided by the server 102 can change based on or according to control signals received from the controls 110.

The system 100 can further include a content presentation feature 114. The content presentation feature 114 can include hardware components configured to deliver content to the passengers of the simulation vehicles 108. The content presentation features 114 can include, for example, one or several: displays; screens; monitors; projectors; illuminators; speakers; lasers; fans; animated props; animated figures; or heaters. In some embodiments, each simulation vehicle 108 can include unique content presentation features 114 and in some embodiments, the content presentation features 114 can be non-unique to some or all of the simulation vehicles 108. In some embodiments in which the simulation vehicle 108 includes unique content presentation features 114, the content presentation features 114 can be a part of the simulation vehicle 108, can be attached to the simulation vehicle 108, and/or can move with the simulation vehicle 108 from the starting point to the termination point.

The system 100 can include one or several transit features 116. In some embodiments, the one or several transit features 116 can move the one or several simulation vehicles 108 from the starting point to the termination point. In some embodiments, the one or several transit features 116 can comprise, for example, one or several: tracks; turntables; moving arms; paths; and/or channels. The one or several transit features 116 can include one or several positioning/timing features 118. In some embodiments, the one or several positioning/timing features 118 can determine one or several positions of one or several simulation vehicles 108 between the starting point and the termination point. In some embodiments, for example, the positioning/timing features 118 can include one or several sensors that can determine when a simulation vehicle passes a predetermined point or location between the starting point and the termination point.

Figure 2:
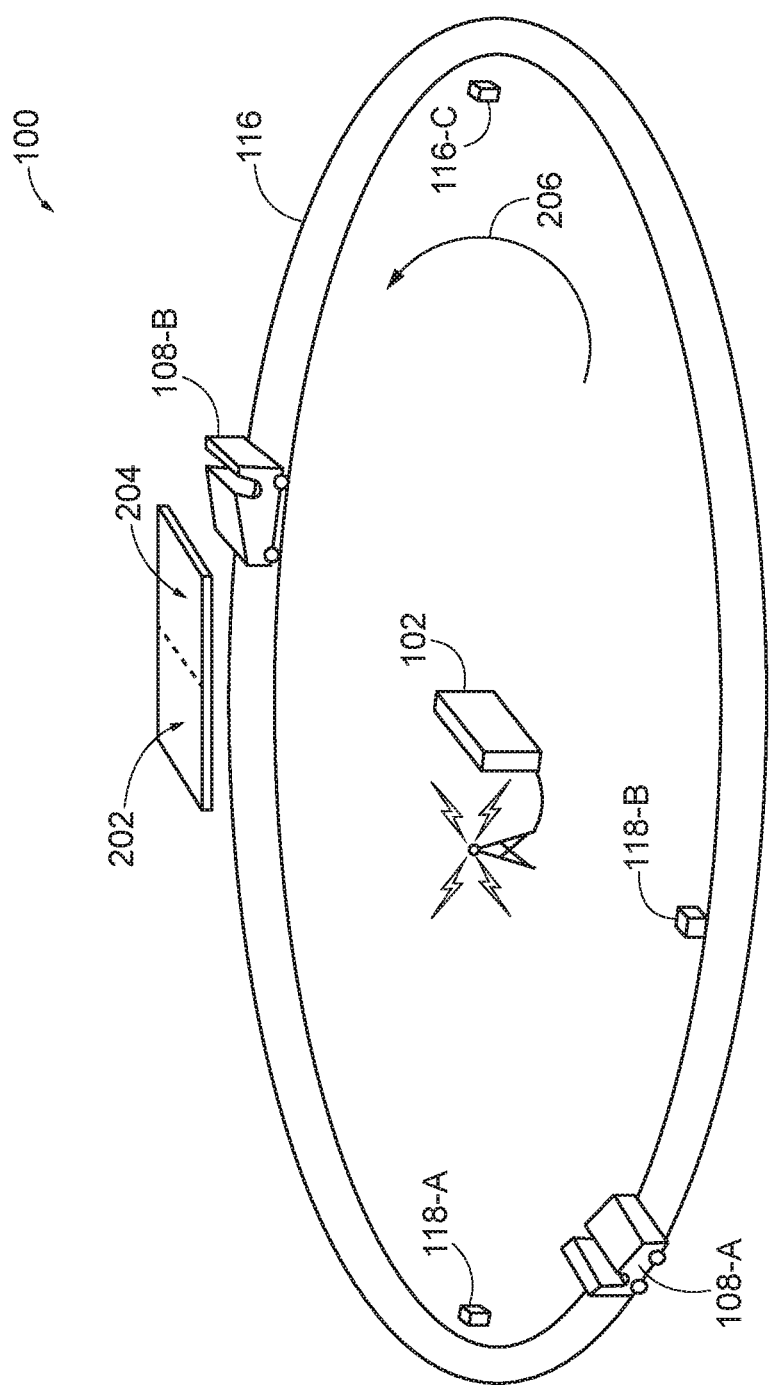
FIG. 2 is a schematic illustration of one embodiment of a system including simulation vehicles.

With reference now to FIG. 2, a schematic illustration of one embodiment of the system 100 including simulation vehicles is shown. The system 100 can include the processor 102, at least one simulation vehicle 108, the transit feature 116, and a plurality of position/timing sensors 118. The system 100 can further include the starting position 202 and the terminating position 204, also referred to herein as the termination position 204. In some embodiments, the starting position 202 and the terminating position 204 can be co-located. As indicated by the arrow 206, each of the simulation vehicles 108 can move around the transit feature 116, which in this embodiment is a track, from the starting position 202 to the terminating position 204.

In some embodiments, one or several passengers can load into the simulation vehicle 108 at the starting position 202 and the simulation vehicle 108 can begin to move from the starting position 202 to the termination position 204. In some embodiments, the initiation movement from the starting position 202 can coincide with the starting of providing content to the passengers of the simulation vehicle 108, and in some embodiments, the starting of providing content to the passengers of the simulation vehicle 108 can proceed the starting of movement of the simulation vehicle 108 from the starting position 202 to the terminating position 204. In some particular embodiments, for example, content can be provided to passengers of the simulation vehicle before the starting of movement of the simulation vehicle 108 from the starting position 202 to the terminating position 204, and the starting of movement of the simulation vehicle 108 from the starting position 202 to the terminating position 204 can be initiated by the receipt of a user input at the simulation vehicle 108.

In some embodiments, the content that is provided to the passengers of the simulation vehicle 108 can be unique to the passengers of the simulation vehicle 108. The uniqueness of the provided content can be based on user inputs that affect the provided content, which user inputs can be provided via the controls 110 of the simulation vehicle. In some embodiments, the inputs of passengers of a simulation vehicle can affect the duration of the content provided to those passengers. For example, the duration of the content can decrease if the passengers are skilled and quickly overcome challenges, opponents, or obstacles, or alternatively, the duration of the content can increase if the passengers are unskilled and fail to quickly overcome challenges, opponents, or obstacles. Further, as user inputs in other sleds can affect the duration of the provided content in those other sleds and the speed with which those other sleds move from the starting position 202 to the termination position 204, the duration of the content in a first sled 108-A can be affected by user inputs received in a second sled 108-B.

The content can be provided to the simulation vehicle 108 by the server 102, and specifically, the game engine 104 can generate a virtual world based on, for example, information retrieved from the scene database 106-B, which virtual world can be the source of the content provided to the passengers of the simulation vehicle 108. As the simulation vehicle 108 transits from the starting position 202 towards the terminating position 204, the position of the simulation vehicle 108 can be determined and/or monitored and progress through the provided content can likewise be determined and/or monitored. In some embodiments, for example, the position of the simulation vehicle 108 can be determined based on one or several positioning features 118, and specifically as the simulation vehicle passes positioning features 118. In some embodiments, an estimated time until arrival of the terminating position 204 can be determined when the simulation vehicle 108 passes one of the position features 118. In some embodiments, this estimated time can be used to set or reset a timer or clock such as a countdown timer which can track the estimated amount of time until the simulations led 108 arise of the terminating position.

The estimated amount of time until the simulation vehicle arrives at the terminating position 204 can be compared to an estimated duration of the presentation of the remaining content. Based on this comparison, the processor 102 can customize to be provided content with information from the customization database 106-C. This customization can be performed one or several times such that the provided content reaches the end simultaneously with the arrival of the simulation vehicle at the terminating position 204. In some embodiments, the simultaneous reaching of the end of the provided content with the arrival of the simulation vehicle of the terminating position 204 can include the reaching of the end of the provided content within +/−1 second of reaching the terminating position 204, within +/−5 seconds of reaching the terminating position 204, within +/−10 seconds of reaching the terminating position 204, within +/−15 seconds of reaching the terminating position 204, within +/−20 seconds of reaching the terminating position 204, within +/−30 seconds of reaching the terminating position 204, within +/−one minute of reaching the terminating position 204, or any other or intermediate range of times around the reaching of the terminating position 204.

III. Simulation Vehicle

Figure 3:
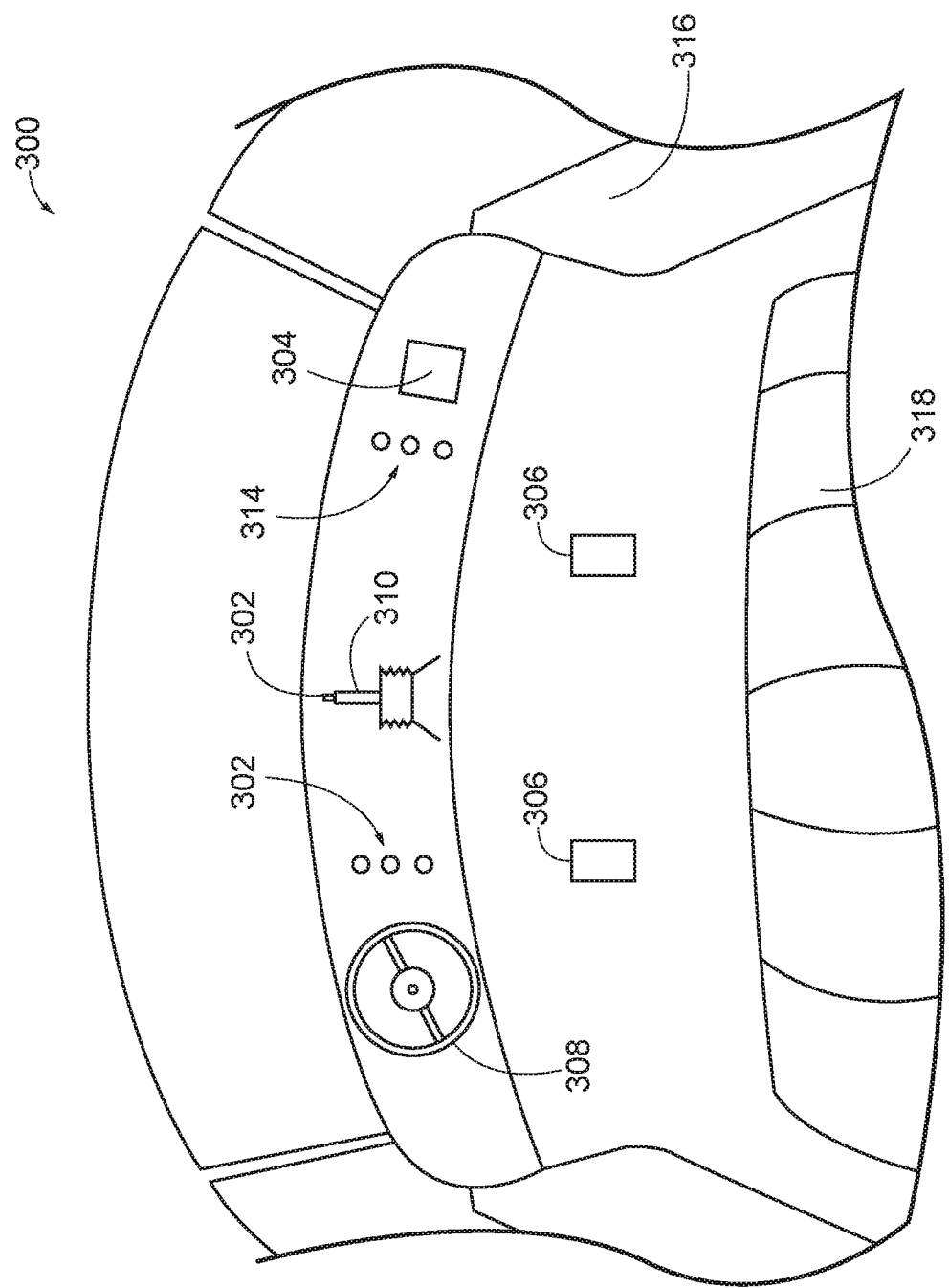
FIG. 3 is an illustration of one embodiment of the passenger area of the simulation vehicle.

With reference now to FIG. 3, an illustration of one embodiment of the passenger area 300 of the simulation vehicle 108 is shown. The simulation vehicle 108 includes the controls 110 and the effect features 112. The user controls 112 can include one or several: buttons 302; pedals 306; steering wheels 308; control sticks 310; or the like. In some embodiments, some or all of the user controls 112 can be redundant so that multiple user can control the same functionality of the simulation vehicle 108 and/or of the simulation, and in some embodiments, some or all of the user controls 112 can be non-redundant so that different users can control different functionality of the simulation vehicle 108. The effect features 112 can include, for example, one or several: displays 304, including screens, monitors, touchscreens, or the like; one or several gauges 314, the motion base 316, or the like. As seen in FIG. 3, the simulation vehicle 108 can include accommodations 318 which can include a seat, one or several passenger restraints, or the like.

IV. Dynamic Show-Length Variation

Figure 4:
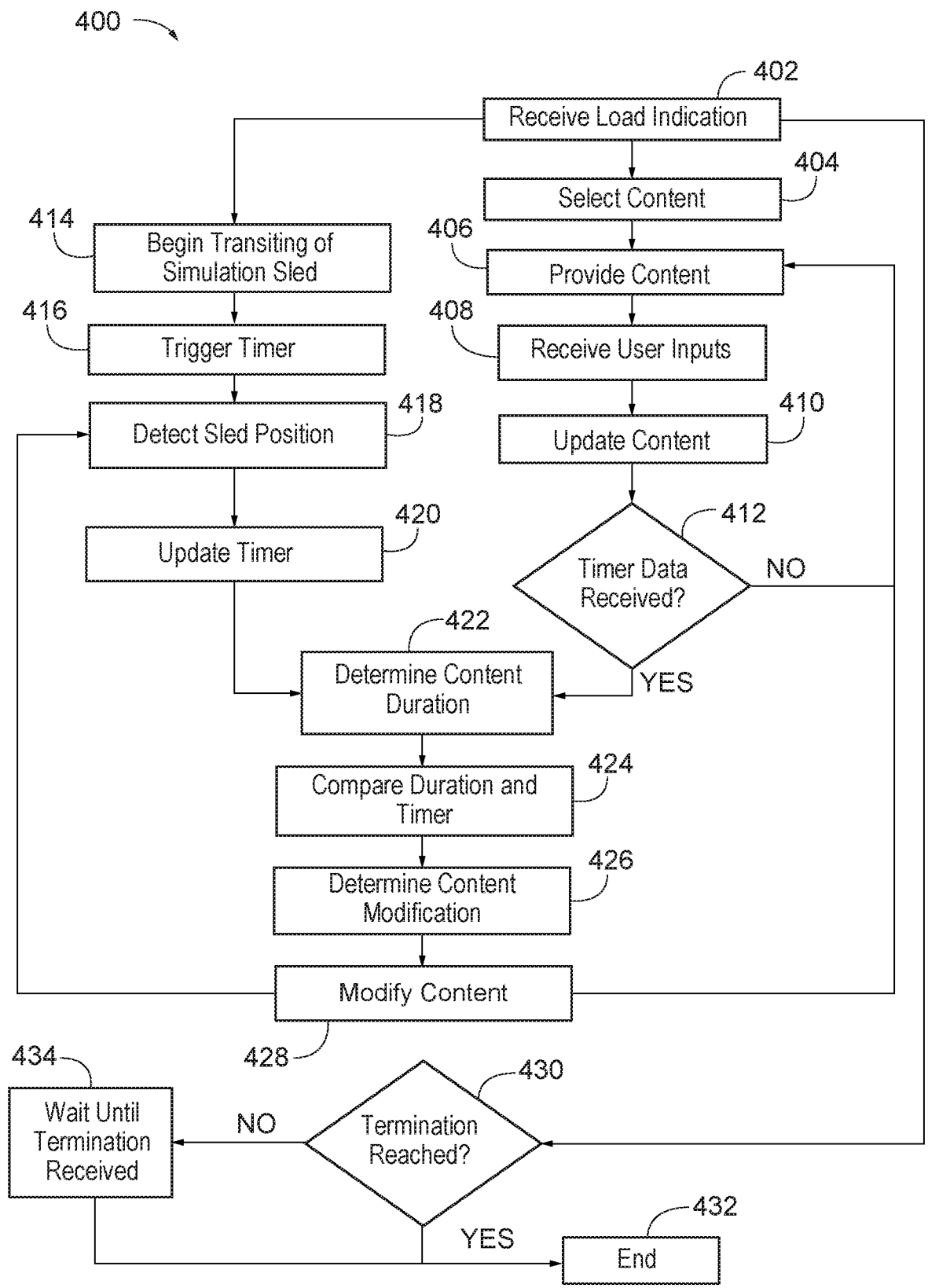
FIG. 4 is a flowchart illustrating one embodiment of a process for dynamic show-length variation.

With reference now to FIG. 4, a flowchart illustrating one embodiment of a process 400 for dynamic show-length variation is shown. The process 400 can be performed by all or portions of the system 100 and can be specifically performed by the processor 102 that can be communicatively connected with one or several simulation vehicles 108 as they move from the starting position 202 to the terminating position 204. In some embodiments, performance of the process can result in the reaching of the end of the narrative of the provided content simultaneous with the arrival of the simulation vehicle at the terminating position 204 and/or the reaching of an intermediate point in the narrative of the provided content simultaneous with the arrival of the simulation vehicle at a waypoint intermediate between the starting position 202 and the terminating position 204.

The process 400 can begin to block 402, wherein a load indication can be received by the server 102. In some embodiments, the load indication can be received by the server 102 from one of the simulation vehicles 108 and can identify the completed loading of one or several passengers into the simulation vehicle 108 and specifically into the accommodations 318 of the simulation vehicle 108. In some embodiments, load indication can comprise a two-part indication. In such embodiments, this two-part indication can include a first portion indicating or identifying the arrival of the simulation vehicle at the starting position 202. This two-part indication can further include a second portion indicating or identifying the completed loading of one or several passengers into the simulation vehicle 108. The load indication can be received by the processor 102 via the communication network 130.

In some embodiments, the load indication can be automatically sent by the simulation vehicle in response to, for example, one or several passenger restraints being moved or placed in a locked configuration so as to restrain one or several passengers in the accommodations 318 of the simulation vehicle 108. Alternatively, in some embodiments, the load indication can be generated based on a user input into a device communicatively connected to the processor 102. In such an embodiment, a ride operator can provide this user input after the completed loading of one or several passengers into the simulation vehicle 108.

At block 404 of the process 400, content is selected for presentation to the passengers in the simulation vehicle 108. In some embodiments, the selected content can be selected from the memory 106 and specifically from the scene database 106-B by the processor 102. In some embodiments, the selecting of content can include the generation of a virtual world based on information retrieved from the memory 106 by the server 102 and specifically by the gaming engine 104.

After the content has been selected, the process 400 proceeds to block 406 wherein all or portions of the content are provided. In some embodiments, the provided content can comprise one or several scenes that together form the narrative or the story. In some embodiments, this can include starting the providing of the content including starting the providing of the narrative of the provided content. In some embodiments, this can include the sending of content for providing from the processor 102 to the one or several content presentation features 114. In some embodiments, this can include the sending of the image or video data to one or several screens, monitors, projectors, or the like, the sending of sound information to one or several speakers or audio components, and/or the sending of motion data to the motion base 316. The content presentation features 114 can receive data containing the content and can provide an/or begin providing that content to the passengers of the simulation vehicle 108.

After or simultaneous with the providing of content, the process 400 proceeds to block 408 wherein one or several user inputs, also referred to herein as passenger inputs are received. In some embodiments, these one or several user inputs are received via the interaction of the one or several passengers with the controls 110 of the simulation vehicle 108. In some embodiments, these one or several passenger inputs can be received via one or several passenger devices such as smart phones, tablets, or the like communicatively connected with the processor 102. The received passenger inputs can be communicated from the controls 110 of the simulation vehicle or from the one or several passenger devices to the server 100 to the communication network 130.

After the user inputs have been received, or simultaneous with the receipt of the user inputs, the process 400 proceeds to block 410 wherein the virtual world or the content is updated based on the received user inputs. In some embodiments, for example, user inputs can cause and effect in the virtual world from which the content is being presented. In such embodiments, the virtual world and/or the provided content can be updated to reflect these effects caused by the user inputs. In some embodiments, these updates to the content can include modifying one or several scenes or sequences in the content, which updates can increase or decrease the duration of content to be provided before the end of the narrative or story is reached. These updates can include, for example, the destruction of an object or character, the firing or use of a weapon, a change of the relative virtual position, acceleration, and/or motion of passengers with respect to objects or characters in the virtual world, or the like. The content and/or virtual world can be updated by the processor 102 and specifically by the gaming engine 104.

After the content has been updated, the process 400 proceeds to decision step 412 wherein it is determined if primary data has been received. In some embodiments, simultaneous with this step, the process 400 can return to block 406 and can continue providing content and specifically can provide the content updated according to block 410. If it is determined that timer data has not been received, the process 400 can return to block 406 and can continue providing content as outlined above, or the process 400 can wait until timer data has been received.

In some embodiments, simultaneous with some or all of steps 402 to 412 the process can include some or all of the steps 414 through 422 control the position and/or motion of the simulation vehicle 108. At block 414 of process 400, the transiting of the simulation vehicle from starting position 202 to the terminating position 204 is initiated. In some embodiments, step 414 can include the generation and sending of control signals from the processor 102 to the simulation vehicle 108 and/or to the one or several transit features 116 to start controlling the movement of the simulation vehicle 108. In some embodiments, step 414 can be performed after the receipt of the load indication at block 402, after simultaneous with the providing of content in block 406, after simultaneous with the receipt of user inputs at block 408, or after simultaneous with the update of content in block 410. In some embodiments, for example, the simulation vehicle 108 can begin moving from the starting position 202 to the terminating position 204 immediately after the receipt of the load indication, whereas in other embodiments the simulation vehicle begins moving from the starting position 202 to the terminating position 204 simultaneous with the initiation of providing content or subsequent to the user inputs such as, for example, user depression of a button causing the starting of a vehicle. In some embodiments, the processor 102 can determine a departure of the simulation vehicle, in response to the received load indication of block 402 or in response to the beginning of the transiting of the simulation vehicle 108 from the starting position 202 to the termination position 204.

After or simultaneous with the initiation of the transiting of the simulation vehicle from the starting position 202 or from a way point to the terminating position 204, a timer or clock can be triggered or started. This timer or clock can be embodied in hardware or software within the processor 102. In some embodiments, this time or clock can track the amount of time since the departure from the starting position, the amount of time since the attainment or passing of a waypoint between the starting position 202 and the terminating position, or the estimated amount of time until arriving at waypoint such as a next waypoint or at the terminating position 204. In some embodiments, the estimated amount of time until the arrival of the simulation vehicle 108 at a waypoint such as the next waypoint or at the terminating position 204 can be an estimated minimum amount of time. In embodiments in which the timer track the estimated amount of time until the arrival of the simulation vehicle 108 at the waypoint such as the next waypoint or at the terminating position 204, the timer can comprise a countdown timer.

After the timer has been triggered, the process 400 proceeds to block 418, wherein a position of the simulation vehicle 108 is detected and/or determined. The position of the simulation vehicle 108 between the starting position 202 and the terminating position 204 can be constantly or periodically monitored or determined. In some embodiments, for example, the control of the one or several transit features can allow the constant monitoring of the position of the simulation vehicle 108. In other embodiments, the position of the simulation vehicle 108 can be determined when the simulation vehicle reaches one or several waypoints between the starting position 202 and the terminating position 204, which one or several waypoints can coincide with the position of one or several positioning/timing features 118. Specifically, in some embodiments, each waypoint can have an associated positioning/timing feature 118 so, as depicted in FIG. 2, a first waypoint can be associated with a first positioning/timing feature 118-A, a second waypoint can be associated with a second positioning/timing feature 118-B, and a third waypoint can be associated with a third positioning/timing feature 118-C.

After the sled position has been determined and/or detected, or after the simulation vehicle 108 reaches a waypoint, the timer can be updated as indicated in block 420 of FIG. 4. In some embodiments, this update of the timer can include a recalculation of the estimated amount of time, and specifically a recalculation of the estimated minimum amount of time until the simulation vehicle 108 arrives at the terminating position 108 or at the waypoint such as the next waypoint. This update can be performed by processor 102.

In some embodiments, the update of the timer 420 can trigger the providing of timer data, and returning again to decision step 412, if it is determined that timer data has been received, the process 400 proceeds from decision step 412 and from block 420 to block 422, wherein the duration of content until the end of the story or narrative or the intermediate point in the story or narrative is reached is determined. In some embodiments, this can include determining an estimated minimum duration of the content until the intermediate point in the story or narrative or the end of the story or narrative is reached. This determination of the duration of the content until the intermediate point in the story or narrative or the end of the story or narrative is reached can be performed by the processor 102 and/or the gaming engine 104.

After the duration of the content is determined, the process 400 proceeds to block 424, wherein the duration of the content and the timer are compared. In some embodiments, this can include comparing the estimated amount of time until the simulation vehicle 108 reaches the waypoint such as the next waypoint or reaches terminating position 204 to the estimated duration of the content until the intermediate point in the story or narrative or the end of the story or narrative is reached. In some embodiments, the result of this comparison can be a value characterizing the discrepancy between the estimated amount of time until the simulation vehicle 108 reaches the waypoint such as the next waypoint or the terminating position 204 to the estimated duration of the content until the intermediate point in the story or narrative or the end of the story or narrative is reached. This value can, in some embodiments, be a measure of time, and specifically of seconds or minutes. This comparison can be performed by the server 102.

After the estimated amount of time until the simulation vehicle 108 reaches the waypoint such as the next waypoint or the terminating position 204 has been compared to the estimated duration of the content until the intermediate point of the story or narrative or the end of the story or narrative is reached, the process 400 proceeds to block 426, wherein a content modification is determined. This content modification can include, for example, the addition of a scene, the removal of a scene, the shortening of a scene, or the lengthening of a scene. In some embodiments, the content modification can be determined and/or selected to minimize or eliminate the discrepancy between the estimated amount of time until the simulation vehicle 108 reaches the terminating position 204 and the estimated duration of the content until the end of the story or narrative is reached. The content modification can be determined and/or selected from one or several scenes, sequences, or modifications that can be stored in the customization database 106-C.

In some embodiments the determining of a content modification can include the identification of one or several flex scenes. As used herein, a flex scene is a scene within the provided content that can be seamlessly modified to change the duration of the modified content. In some embodiments a flex scene can be a non-contributory scene. In some embodiments, there can be at least one flex scene subsequent to each waypoint between the starting position 202 and the terminating position 204. The one or several flex scenes can be identified in the memory 106 and specifically in the scene database 106-B or in the customization database 106-C.

In embodiments with a flex scene, the determining of a content modification can further include determining an update to the one or several identified flex scenes. This can include determining whether the duration of the provided content should be increased or decreased, and selecting one or several customizations to the one or several identified flex scenes from the customization database 106-C or creating one or several customization to the one or several identified flex scenes. These one or several customizations can be selected and/or created by the server 102.

After the modification has been determined, the process 400 proceeds to block 428, wherein the content is modified. In some embodiments, this can include the implementation of the determined modification to thereby add a scene, remove a scene, extend a scene, or contract a scene. In some embodiments, the modification can be seamlessly performed, and specifically, in some embodiments, the modification can be performed without creation of a new virtual world. The content can be modified by the server 102.

At decision step 430 it is determined if the waypoint such as the next waypoint or the termination position 204 has been reached. Decision step 430 can be performed at any point in the process 400. In some embodiments, for example, if an indication of arrival at the waypoint such as the next waypoint or at the termination position 204 has been received, the process 400 can proceed to block 432 and the process can end. In some embodiments, this ending of the process 400 can include the providing of an indicator to the passengers of the simulation vehicle 108 to disembark from the simulation vehicle 108, the providing of a command for the release of passenger restraints, and/or for the opening of any doors of the simulation vehicle 108. Alternatively, if the indicator of the arrival at the waypoint such as the next waypoint or at the termination position 204 has not been received, the process 400 can proceed to block 434 and wait until the indicator of the arrival at the termination position 204 has been received and then proceed to block 432.

V. Computer System

Figure 5:
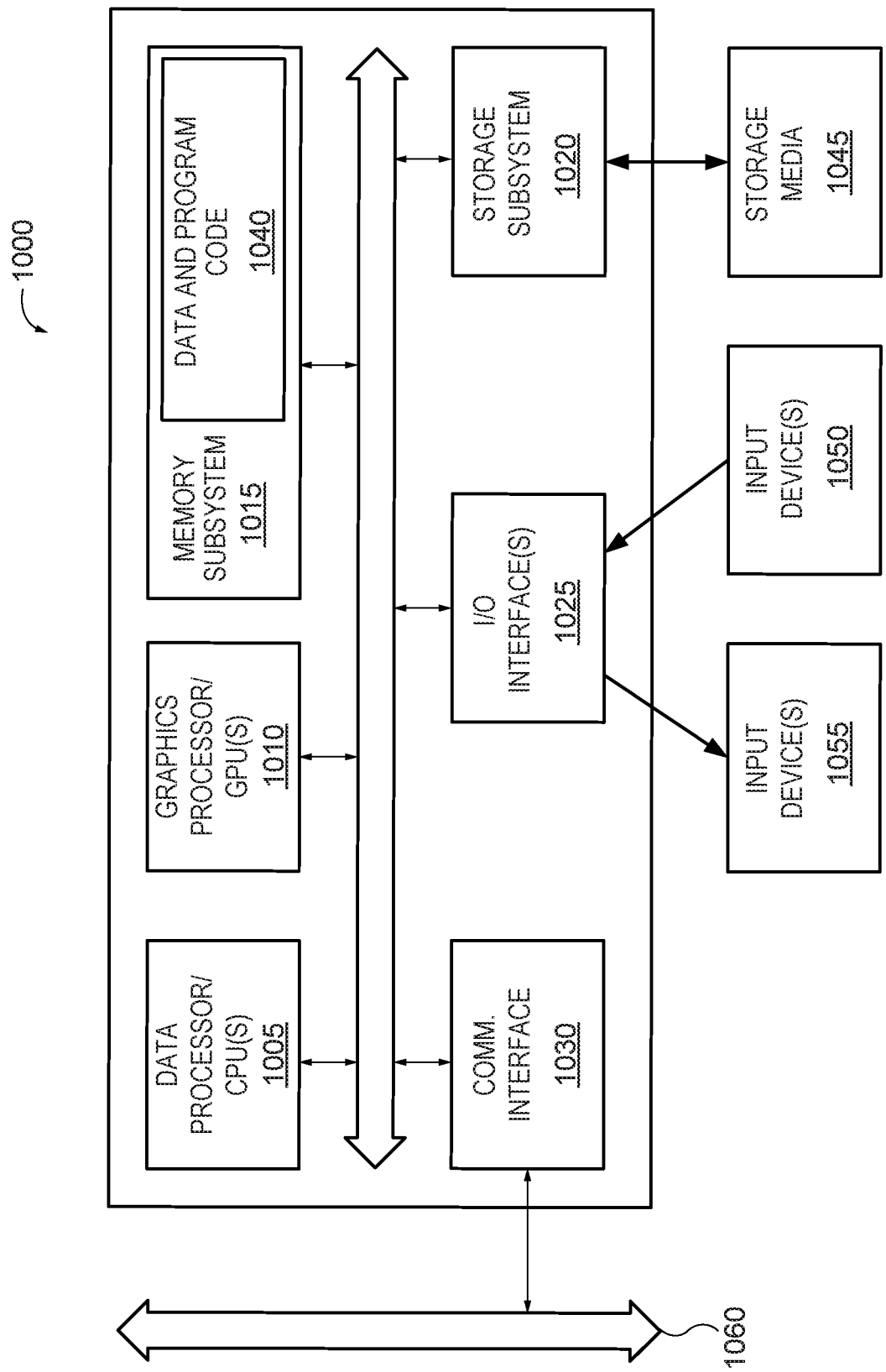
FIG. 5 is a block diagram of a computer system or information processing device that may incorporate an embodiment, be incorporated into an embodiment, or be used to practice any of the innovations, embodiments, and/or examples found within this disclosure.

FIG. 5 shows a block diagram of computer system 1000 that is an exemplary embodiment of the processor 102 and can be used to implement methods and processes disclosed herein. FIG. 5 is merely illustrative. Computer system 1000 may include familiar computer components, such as one or more one or more data processors or central processing units (CPUs) 1005, one or more graphics processors or graphical processing units (GPUs) 1010, memory subsystem 1015, storage subsystem 1020, one or more input/output (I/O) interfaces 1025, communications interface 1030, or the like. Computer system 1000 can include system bus 1035 interconnecting the above components and providing functionality, such connectivity and inter-device communication.

The one or more data processors or central processing units (CPUs) 1005 execute program code to implement the processes described herein. The one or more graphics processor or graphical processing units (GPUs) 1010 execute logic or program code associated with graphics or for providing graphics-specific functionality. Memory subsystem 1015 can store information, e.g., using machine-readable articles, information storage devices, or computer-readable storage media. Storage subsystem 1020 can also store information using machine-readable articles, information storage devices, or computer-readable storage media. Storage subsystem 1020 may store information using storage media 1045 that can be any desired storage media.

The one or more input/output (I/O) interfaces 1025 can perform I/O operations and the one or more output devices 1055 can output information to one or more destinations for computer system 1000. One or more input devices 1050 and/or one or more output devices 1055 may be communicatively coupled to the one or more I/O interfaces 1025. The one or more input devices 1050 can receive information from one or more sources for computer system 1000. The one or more output devices 1055 may allow a user of computer system 1000 to view objects, icons, text, user interface widgets, or other user interface elements.

Communications interface 1030 can perform communications operations, including sending and receiving data. Communications interface 1030 may be coupled to communications network/external bus 1060, such as a computer network, a USB hub, or the like. A computer system can include a plurality of the same components or subsystems, e.g., connected together by communications interface 1030 or by an internal interface.

Computer system 1000 may also include one or more applications (e.g., software components or functions) to be executed by a processor to execute, perform, or otherwise implement techniques disclosed herein. These applications may be embodied as data and program code 1040. Such applications may also be encoded and transmitted using carrier signals adapted for transmission via wired, optical, and/or wireless networks conforming to a variety of protocols, including the Internet.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

The invention claimed is:

1. A method for dynamic show-length variation, the method comprising:
   determining a departure of a first simulation vehicle from a starting position;
   providing content to a passenger of the first simulation vehicle based on received user inputs in the first simulation vehicle, the content comprising a beginning, an end, and a plurality of scenes, wherein the content is provided while the first simulation vehicle is en route between the starting position and a termination position; and
   customizing a length of the provided content so the content reaches the end as the first simulation vehicle reaches the termination position, wherein customizing the length of the provided content comprises:
 determining an estimated time until arrival at the termination position;
 determining a duration of the provided content until the end of the provided content;
 determining a discrepancy between the estimated time until arrival at the termination position and the duration of the provided content until the end of the provided content; and
 altering the provided content to minimize the determined discrepancy.

2. The method of claim 1, wherein the starting position and the termination position are co-located.

3. The method of claim 1, wherein the content is provided via at least one of: a screen; a projector; a speaker; an animated prop; an animated figure; and a display.

4. The method of claim 1, wherein the content comprises an interactive story.

5. The method of claim 1, wherein customizing the length of the provided content comprises at least one of: adding a scene; removing a scene; extending a scene; or extracting a scene.

6. The method of claim 5, wherein the length of the provided content is customized based on a user input received from a passenger in a second simulation vehicle.

7. The method of claim 1, further comprising: determining arrival at the termination position; and providing an indicator to a passenger on the first simulation vehicle to disembark the first simulation vehicle.

8. The method of claim 1, wherein altering the provided content comprises: identifying at least one flex scene; determining an update to the flex scene; and updating the flex scene.

9. The method of claim 8, further comprising generating a virtual world with a gaming engine, wherein the provided content is provided from the generated virtual world, and wherein the flex scene is seamlessly updated without generation of a new world.

10. The method of claim 1, further comprising: determining an estimated time until arrival at a waypoint located intermediate between the starting position and the terminating position; and customizing the length of the provided content based on the estimated time until arrival at the waypoint.

* * * * *